United States Patent [19]

Hagen et al.

[11] Patent Number: 4,645,517

[45] Date of Patent: Feb. 24, 1987

[54] DRAIN MANIFOLD FOR AIR DATA SENSOR

[75] Inventors: Floyd W. Hagen, Eden Prairie; Richard V. DeLeo, Hopkins, both of Minn.

[73] Assignee: Rosemount Inc., Eden Prairie, Minn.

[21] Appl. No.: 778,416

[22] Filed: Sep. 20, 1985

[51] Int. Cl.$^4$ ............................................ B01D 19/00
[52] U.S. Cl. ........................................ 55/182; 55/208; 55/267; 55/270; 55/428; 73/180; 73/182
[58] Field of Search ................. 55/182, 208, 267, 270, 55/316, 317, 328, 428–432; 73/180, 182, 861, 65

[56] References Cited

U.S. PATENT DOCUMENTS

| | | | |
|---|---|---|---|
| 2,983,331 | 5/1961 | Helsley, Jr. | 55/182 X |
| 3,130,022 | 4/1964 | Clark | 55/182 |
| 4,096,744 | 6/1978 | DeLeo et al. | 73/180 |
| 4,370,152 | 1/1983 | Luper | 55/316 X |
| 4,378,696 | 4/1983 | DeLeo et al. | 73/180 |
| 4,545,791 | 10/1985 | Schweikl et al. | 55/182 |

Primary Examiner—Robert Spitzer
Attorney, Agent, or Firm—Kinney & Lange

[57] ABSTRACT

A unitized drain manifold apparatus for removing water from air in a conduit of an air data sensor system for an aircraft comprises a manifold having a plurality of drain cavities therein. Each drain cavity has a center chamber portion and two end drain chambers positioned vertically above and below the center chamber portion when the aircraft is at rest. The end drain chambers are used for accumulation of water which is separated from the air pressure signal. The cavities are each equipped with two drain passageways such that the accumulated water can be removed from the apparatus in normal or inverted positions. The positioning of the external drain passageways permits water accumulation and removal to occur independently of the spatial orientation of the apparatus and the symmetry of the manifold permits it to be mounted on either side of the aircraft.

16 Claims, 9 Drawing Figures

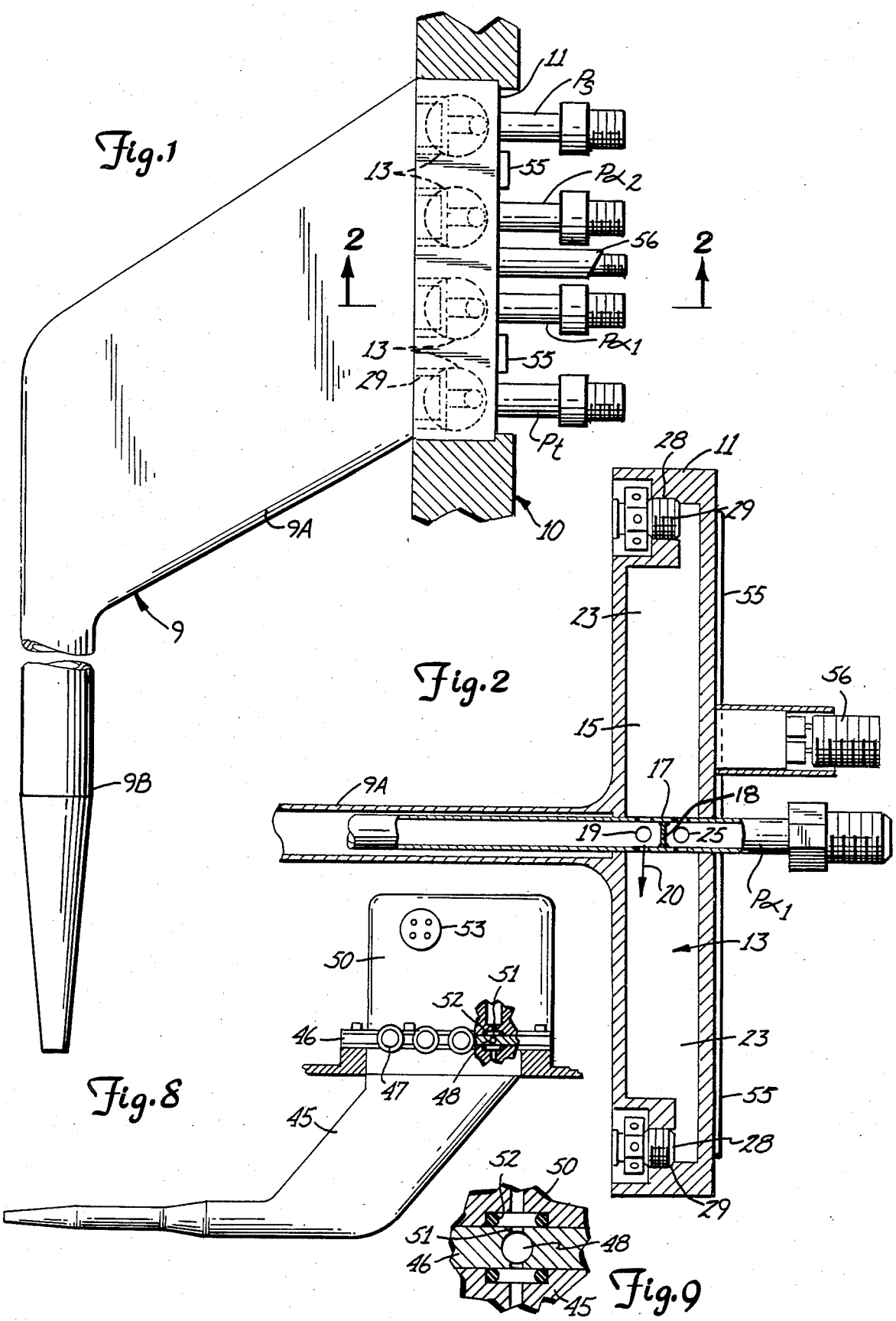

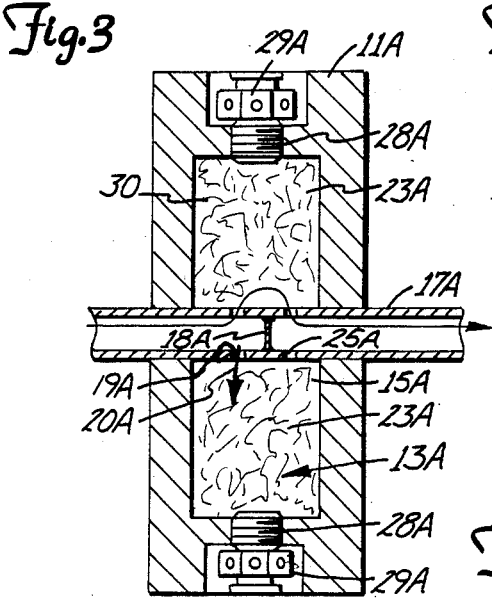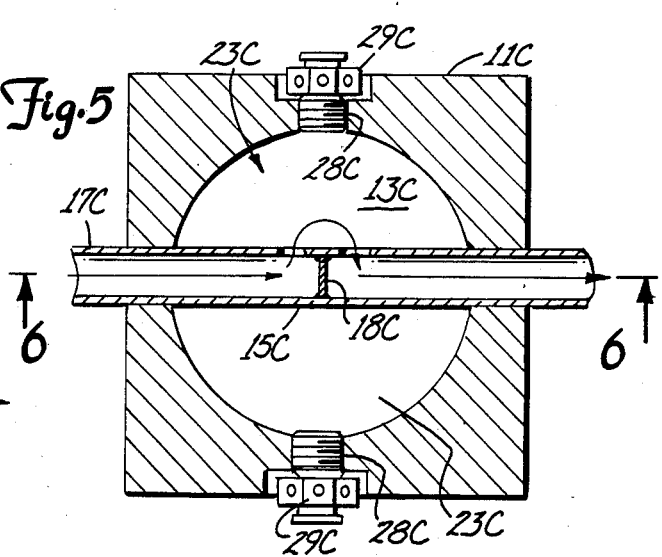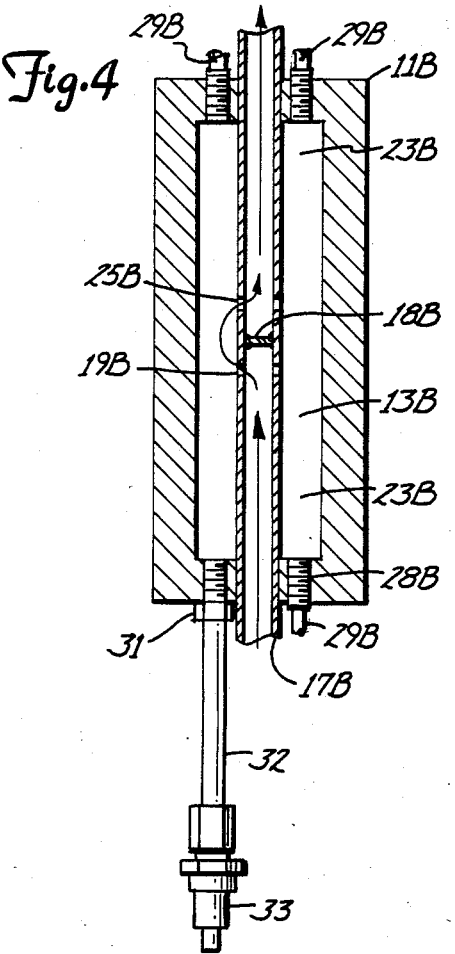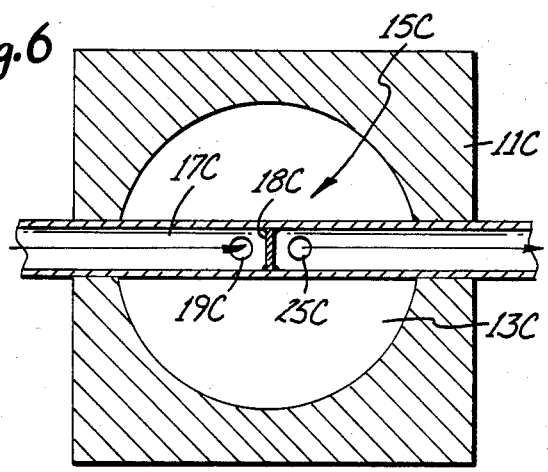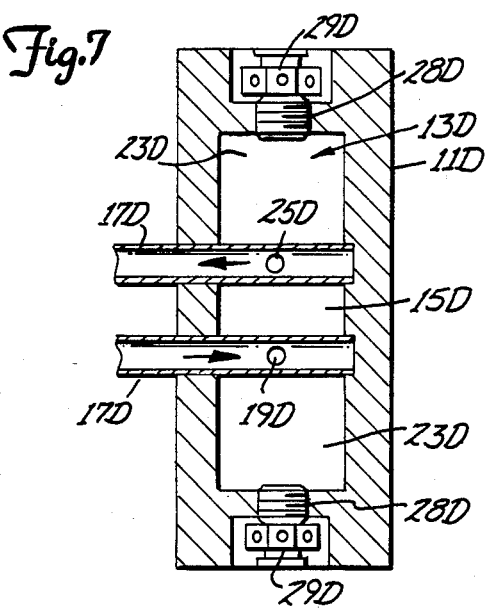

DRAIN MANIFOLD FOR AIR DATA SENSOR

BACKGROUND OF THE INVENTION

1. Field of the Invention.

This invention relates to a drain manifold for use with air data sensors for aircraft.

2. Description of Prior Art

Most existing aircraft require an extensive network of pneumatic lines connecting the pitot and static pressure signals to the tranducers and indicators located in the aircraft. On a large aircraft, this can result in several hundred feet of tubes or line. The problem is aggravated by the fact that the static pressure signals from the right and left hand sides of the aircraft are generally combined in a manifold before the line is directed to the pressure measuring and/or display locations.

U.S. Pat. No. 3,482,445 to DeLeo et al. discloses a strut mounted dual static tube having sensing ports designed for connection with pneumatic lines to remote instruments. Devices of this type require long lengths of pneumatic line. In addition, U.S. Pat. No. 3,482,445 does not utilize drainage valves which permit the lines to be drained regardless spatial orientation, which is, a desirable feature.

A water trap for a pitot-static system which comprises a separate housing is disclosed in U.S. Pat. No. 3,926,594 to Seib et al. The Seib device is designed for connection to remote instruments using substantial lengths of pneumatic line. The device can not be drained in spatial orientations 180 degrees apart and does not utilize drain outlets which permit drainage of a manifold or water trap.

A variety of gas-liquid separators have been previously used as well. For example, U.S. Pat. No. 3,668,822 to Mannion et al. shows a flow resistance equalizer for a liquid circulation system which includes a vent plug that can be released periodically to open the vent and release any air collected in an air chamber. Air collects in the chamber as the air is released from the flow of liquid due to a decrease in the velocity of the flow. Similarly, U.S. Pat. No. 3,867,115 to Heintzelman shows a gas-liquid separator comprising a vertical housing having a gas inlet and a gas outlet in an upper portion and a drain in a bottom portion thereof. Entrapped liquid is separated from the gas due to a decrease in velocity which occurs within the vertical housing. The Heintzelman device also provides for a resilient wipe which engages the interior surface of the vertical housing to prevent the flow of liquids and particulate impurities to reach the gas outlet of the separator.

Other gas-liquid separators of this type have been disclosed in U.S. Pat. Nos. 3,345,807 to Von Felden; 3,261,146 to Malec; 2,970,669 to Bergson; and 2,513,556 to Furczyk. Each of these patents discloses a housing equipped with a baffled or helical passageway in which entrapped liquids become separated from the inlet gas or air. These devices also provide means for removing the collected liquid from the housing through the use of some type of drain. However, the drainage methods used in these devices are dependent upon a single predetermined spatial orientation for effective drainage. This spatial orientation dependency means that different parts are required for installation on left and right sides of the aircraft.

U.S. Pat. No. 4,135,542 to Chisholm shows a drain device for compressed air lines having two outlet pipes mounted on opposite sides of the collection chamber, theoretically permitting the device to be drained when mounted right side up or inverted. However, the Chisholm device is designed to be used in association with compressed air lines rather than as a drain manifold for an air data sensor having multiple output lines. Chisholm does not disclose manifold-type connections which would permit the device to be directly mounted to a sensor of an air data sensor.

In the ideal case with air vehicle mounted sensors, all pneumatic lines would be completely eliminated, and even pneumatic averaging of signals from sensors on the right and left sides of the aircraft can be accomplished by electrical averaging. The present drain manifold can: (a) be a part of the pitot-static tube, the pitot tube, or a separate static probe, or (b) be placed in close proximity to such sensing probes, or (c) serve as mounting adapter for a pressure transducer assembly, or (d) be installed integrally with a pressure transducer assembly.

SUMMARY OF THE INVENTION

The drain manifold of the present invention comprises a housing having a plurality of drain cavities, which are capable of draining in at least two positions, one with the manifold positioned 180° from the other. The drain manifold preferably can be attached directly to a base of a pitot-static tube or probe of an air data sensor system. In the simplest case, the drain manifold interconnects two drain cavities, one for pitot pressure ($p_t$); and one for static pressure ($p_s$). For more complex air data sensors, additional pitot, static, angle of attack and/or angle of sideslip pressure signals may be coupled to remote transducers through separate additional drain cavities in the manifold. Each drain cavity comprises a closed cavity of substantial volume which has a pressure inlet connection from the sensor probe and an outlet leading to a transducer. Each cavity has two drain outlets facing 180° from each other so that when one is mounted facing vertically down, the other outlet is facing upwardly.

The symmetry of the drain cavities permits the drainage when installed on either the left or right side of the aircraft, without having right and left hand parts.

The baffles are provided to prevent direct flow of the air through the cavity from the inlet to the outlet. Liquid moving in the input line is forced to be diverted into the cavity. The pressure signal is present in the cavity and is carried by an output line or port to a transducer. The water droplets collect in the cavity, and the liquid is subsequently drained. The liquid is thus removed so it will not affect the transducers or remote instruments.

As shown, the pressure signal line from the probe passes through the respective cavities and has a wall blocking the center opening. Ports are provided in the wall of the signal line upstream of the blocking wall so the input pressure is provided to the respective drain cavity. Ports are also provided in the pressure signal line downstream of the baffle so the pressure is carried to the remote transducers. Liquid collects in the drain chamber portions of the cavity so the liquid will be in a lower portion of the chamber when the aircraft is on the ground.

Due to the positioning of the drain chamber portions above and below the air inlet and outlet when the drain manifold is mounted on an aircraft, water will accumulate in one collection chamber in either the upright or inverted positions. Drain plugs can be placed at the ends of both drain chambers, permitting the drain manifold to be drained even if inverted, for example, when the sensor and manifold are mounted on opposite sides of the aircraft (left and right).

An additional feature of the drain manifold of the present invention is its ability to be coupled directly between a sensor and a pressure transducer. The drain manifold may be integrally formed as part of the base of the sensor probe with the transducer fixed to the manifold on the inside of the aircraft skin. Direct mounting eliminates the need for extensive lengths of pneumatic transmission lines connecting the pitot and static pressure signals to the transducers and indicators located in the aircraft.

BRIEF DESCRIPTION OF THE DRAWINGS

FIG. 1 is a plan view of a typical air data sensor probe having a drain manifold of a first form of the present invention formed therein.

FIG. 2 is an enlarged fragmentary sectional view taken on line 2—2 in FIG. 1.

FIG. 3 is a vertical sectional view of a drain manifold of the present invention manifold so that it may be mounted remote from the sensor probe base and has provisions for trapping moisture for draining.

FIG. 4 is a vertical sectional view of a further modified form of the drain manifold made according to the present invention.

FIG. 5 is a horizontal sectional view of a still further modified form of the present invention comprising a manifold useful with a single pressure line.

FIG. 6 is a sectional view taken on line 6—6 in FIG. 5.

FIG. 7 is a vertical sectional view of a form of the invention where the input and output pressure signal carrying lines extend from the same surface of the manifold.

FIG. 8 is a plan view of an air data sensor probe having a drain manifold plate made according to the present invention mounted on the sensor, and a transducer package mounted directly on the manifold.

FIG. 9 is a fragmentary cross sectional view of one cavity of the drain manifold of FIG. 8.

DETAILED DESCRIPTION OF THE PREFERRED EMBODIMENTS

A typical air data sensing probe is shown at 9 and has a strut 9A supporting a probe barrel 9B. The barrel has ports for sensing pitot pressure, static pressure, and also pressure ports on the top and bottom of the barrel which deliver pressure signals $p\alpha_1$ and $p\alpha_2$ from which angle of attack can be determined. Such a probe is shown in U.S. Pat. No. 4,378,696.

A drain manifold 11 is integrally formed with the base of the strut 9A and forms the mounting base for supporting the strut 9A on an air vehicle 10 (called aircraft for convenience, but intended to include an object moving in a fluid medium). FIG. 1 shows manifold 11 with four separated drain cavities 13, one for each of the pitot pressure, $p_t$; the static pressure, $p_s$; and the two additional angle of attack pressures, $p\alpha_1$ and $p\alpha_2$. Each drain cavity 13 comprises a cylindrical internal chamber having a center portion 15 through which the respective pressure line or tube 17 enters and exits the manifold 11. In FIG. 2, a conduit or line 17 carrying one of the angle of attack pressure signals is shown. Direct passage of water droplets through the center passageway of a conduit or line 17 in the center portion 15 of the drain cavity 13 is blocked with a baffle wall 18.

Any water droplet is forced into the respective cavity 13 through openings or ports 19 formed in the wall of line 17 when such droplet strikes baffle wall 18 as shown by arrow 20. The ports or openings 19 are upstream of the baffle wall. The cavity 13 has end drain chamber portions 23 above and below the center portion and water entering the cavity 13 will drop out of the line 17 into one of two end drain chamber portions 23. The pressure signal communication with the downstream portion of line 17 is through downstream openings 25 which are within the center chamber portion 15 of the cavity. The water droplets are diverted and collected in the cavity end drain chamber portion 23.

As shown in FIG. 2, the end drain chamber portions 23 have threaded drain outlet passageways 28 with push to drain plugs 29 mounted in the drain passageways 28. The passageways 28 face outwardly of the aircraft 10 so that the actuators buttons for the drain plugs 29 are accessible when the probe assembly is mounted on an aircraft wall. When the aircraft is at rest, the cavities 13 can be drained by operating the push to drain valves 29. Such drain valves are commercially available from Autovalve, Inc., Dayton, Ohio.

The drain chamber portion at opposite sides of the center portion where line or tube 17 passes through the cavity 13 collects water whether the probe is oriented as shown or 180° from the position shown. In some installations where the probe is mounted on an aircraft service door which is hinged and rotates 180° from closed to open position, the drain manifold cavities can be drained in either door position. Also, draining is possible for installations on either the right or left side of the aircraft. The cavities are shaped so that draining occurs in substantially any spatial orientation.

FIG. 3 shows a variation of the drain manifold of the present invention where a manifold 11A has a line or conduit 17A passing through a center portion 15A of cavity 13A, and a barrier wall 18A in the line 17A forces water from the upstream portion of the line 17A into the center chamber portion 15A of cavity 13A through the upstream openings 19A, as shown by arrow 20A in FIG. 3. The cavity 13A comprises a substantially hollow cylindrical chamber of sufficient size to collect the water that is introduced into the respective conduit for the sensing ports.

In the embodiment shown in FIG. 3, the line or conduit 17A is mounted such that its axis is perpendicular to the longitudinal axis of the cavity 13 of the drain manifold 11A. Water in the line or conduit 17A drops out of the tube as it strikes the baffle wall 18A and falls to one end drain chamber portion 23A. End drain chamber portions 23A are formed on opposite sides of the center drain chamber portion 15A. Subsequently, the water is drained from one of the drain openings 28A which may have threaded, manually removable plugs or quick drain plugs 29A. The pressure signal in the upstream portion of line 17A is carried into the downstream section of line 17A through downstream openings 25A formed in the line 17A on the downstream side of the barrier wall 18A. Thus, water droplets or other particles are diverted and collected before they reach the transducer and remote pneumatic lines of the air data sensing system. The cavity 13A, with drain passageways at the opposite ends will drain in substantially any spatial orientation.

Another embodiment of the present invention is shown in FIG. 4. The manifold 11B is mounted so the longitudinal axis of the cavity 13B runs vertically, as before, but the longitudinal axis of the pneumatic line or conduit 17B also runs vertically. Preferably, the line 17B is positioned coaxially with the cavity 13B. This configuration is usable where the pneumatic lines or conduits of the air data sensor system runs vertically.

The input signal is indicated by the arrow in the center passageway of line 17B and the upstream end of line 17B is shown at the lower end of the cavity 13B, but the upstream end can be at the bottom. The line 17B has a baffle or barrier wall 18B, and openings or ports 19B on the upstream side of the barrier wall 18B. Water droplets will be diverted laterally into the cavity 13B. The pressure signal is carried into the downstream section of the line 17B through openings 25B.

In the form of the invention shown in FIG. 4, the lower one of the end drain chamber portions 23B of cavity 13B collects the water. The end walls of the manifold 13B are modified so that the large opening 28A for drain plug 29A is eliminated and the line 17B sealing passes through the end walls. One or more small drain passageways 28B are positioned at locations around the line 17B. The passageways 28B are plugged with small plugs 29B.

A still further embodiment of the drain manifold of the present invention is shown in FIGS. 5 and 6. The manifold 11C is formed for a single pneumatic line or conduit 17C and is cube shaped with a generally spherical cavity 13C. The line 17C passes through the center portion 15C of the cavity and there are end drain chamber portions 23C above and below the center chamber portion 15C. A barrier wall 18C is used in line 17C to prevent direct passage of water or other particles through the line 17C, and thereby forcing such particles into the center chamber portion 15C through upstream ports or openings 19C in the wall of line 17C. The pressure signal is carried into downstream ports or openings 25C formed in the downstream portion of line 17C. Push to drain plugs 29C are mounted in drain passageways 28C.

As shown in FIG. 7, a maifold 11D also can be formed as an end block for the lines, for example, where there is a bulkhead for mounting the manifold. This embodiment of the invention has the manifold 11D with a cylindrical center cavity 13D similar to those used in previous forms of the invention. However, the upstream portion of line 17D enters the manifold 11D and cavity 13D and the downstream portion of line 17D exits the cavity 13D on the same side of the manifold 11D, rather than passing through the manifold as shown in the previous embodiments. In this embodiment, it is not necessary to include a baffle wall in the center passageway of the line 17D as it is mounted such that an interior wall of the cavity 13D constitutes a baffle against which particles of water will impinge. The ends of the upstream and downstream sections of line 17D are abutted against the interior surface of cavity 13D opposite from the entry side of the manifold 11D. Openings 19D are formed in the walls of the upstream portion of line 17D in order to permit incoming water or particles to pass from the upstream section of line 17D into the cavity 13D and the pressure signal is carried to the downstream section of line 17D, through ports 25D where it is carried to the remote portion of the system.

The cavity 13D has a center chamber portion 15D and end drain chamber portions 23D that have drain passageways 28D in which push to drain fittings 29D (or other plugs) are inserted.

As shown in FIGS. 2 through 7, the end drain chamber portions are formed on the ends of the cavity, with one end chamber vertically up and one vertically down with respect to the center chamber portion. The end drain chamber portions 23, 23A, 23B, 23C and 23D are used to accumulate the water which drops out of the respective pneumatic lines. Water can be accumulated and drained in either orientation, i.e. upright or inverted, because of the orientation of the drain passageways 28, 28A, 28B, 28C and 28D with respect to the center of the cavity. In addition, the symmetry of the center cavity for each line allows the pressure transducer-manifold assembly to be mounted on either side of the aircraft with equal effectiveness, making the drain manifold, 11, 11A, 11B, 11C and 11D of the present invention more versatile and more economical than previously known manifold devices.

Separate drain passageways are provided for each cavity 13 in the manifold 11 for either upright or inverted drainage. As shown, push to drain valve plugs are used to empty the accumulated water from the end drain chamber portions 23, 23A, 23B, 23C and 23D as needed. The drain plugs 29, 29A, 29B, 29C and 29D may be the commonly known screw-in type plug. The end drain chamber portions may be filled with sponges 30 if desired, as shown in FIG. 3. The sponges 30 are used to absorb any accumulated water. The use of sponges may be undesirable in some cases as they must be replaced or dried periodically.

If desired, the upper drain openings (when the aircraft is at rest) can be fitted with a pressure connector that would allow the pressure in the respective cavity to be connected to indicators, or to be "T"-ed off to pressure lines which go to auxiliary pressure transducer or to other systems on the aircraft.

Further, as shown in FIG. 4 as an alternative, the lower drain plug can be replaced with a fitting 31 connected to a short length of transparent tubing 32 which would allow visual examination to see if water has accumulated in the drain chamber. Either a push to drain plug or a solid plug 33 could then be placed at the lower extremity of the transparent tubing 32. The drain manifolds of the present invention can supply additional moisture collection volume through the use of the transparent tubing 32 attached to the drain passageways 28, 28A, 28B, 28C and 28D or through the use of moisture collection bottles attached to the drain passageways 28, 28A, 28B, 28C and 28D.

The drain manifold can be connected directly to the $p_t$, $p_s$ and $p\alpha_1-p\alpha_2$ pressure signal lines through the use of fittings which connect pneumatic pressure signals from the manifold 11 to pressure transducers or indicators located in other parts of the aircraft. The assembly can include sensors which give a direct electrical output with no need for internal pressure transmission lines in the aircraft.

As shown in FIG. 1, the assembly is designed for mounting on the aircraft where the sensor or probe is inserted through a slot in the fuselage skin and the drain manifold may be just to the interior of the aircraft skin. The tubes carrying each of the pressure signals may then extend from the manifold to the transducer.

An alternate installation is shown in FIG. 8. An air data sensor 45 has a drain manifold 46 integrally mounted thereon with separate drain cavities 48 for each pressure signal or pressure lines as shown. The drain manifold 46 is constructed similarly to the manifold shown in FIGS. 1 and 2, but includes drain valves or plugs 47 at the top and bottom of the cavities rather than having the valves facing outwardly as shown in FIG. 2. In this form of the invention instead of having lengths of tubing carrying the signal out from the drain manifold, a transducer package 50 is coupled directly to the drain manifold with suitable ports 51 opening to the cavities 48 through passageways for the respective pressure signal. The output pneumatic lines such as line 17 are plugged with a baffle wall 18 in place to deflect water droplets and openings in the line side walls, such as openings 19 are provided. The ports 51 for the transducer are sealed with seals 52 against the output opening of the rear wall of the cavities in the manifold in a suitable manner, but no downstream length of pneumatic line is necessary.

The transducer 50 has pressure sensors which deliver electrical output signals indicating the pressure sensed. The electrical signals then may be used for indicating instruments or for further calculation to provide the desired air data indications. An electrical connector 53 is used connecting the necessary lead wires to the pressure sensors.

Electrical heaters are used in the air data sensor tubes and struts conventionally and such heaters shown at 55 in FIG. 2 also may be placed on the drain manifold. These electrical heaters 55 are connected to power through a connector 56 and when activated, after a predetermined volume of water accumulates within the external cavities, and the manifold will become hot enough to boil off any water within the cavities. Evaporating the water reduces the use of and can eliminate the need for the drain valves discussed.

The unit may be quite light weight and mounted out of the airstream to eliminate extra drag. In all forms of the invention, the portions of the conduit or line 17, 17A, 17B, 17C or 17D having the moisture discharge openings are spaced from all walls of the cavity in which the line is placed so separation of moisture occurs regardless of spatial orientation. That is, in any angular position, the drain chambers are provided in appropriately facing directions to permit collection of moisture.

The drain manifold has provisions for adequate moisture accumulation, and the moisture accumulation may be scavenged by removing a suitable screw drain plug or using a push to drain type drain plug. The drains work when the manifold is installed on either the right or left side of the aircraft.

The drain manifold also has the feature that additional moisture collection volume can be added to any of the manifold cavities by connecting suitable auxillary chambers formed by transparent tubing or, if necessary, a moisture collection bottle.

The upwardly extending fittings may be utilized to directly connect pneumatic pressure signals from the manifold to pressure transducers or indicators located in other parts of the aircraft.

The drain manifold also has the feature that it may be built into a pitot-static tube or equivalent device such as pitot tube or flush port on the skin of the aircraft. The manifold can be a separate device between the point of measurement and the pressure transducer, for example, it can be mounted on a bulkhead, as shown in the form of FIG. 7.

An integral heater can be provided to provide heat to scavenge accumulated moisture by evaporation.

Although the present invention has been described with reference to preferred embodiments, workers skilled in the art will recognize that changes may be made in form and detail without departing from the spirit and scope of the invention.

What is claimed is:

1. A drain manifold for an aircraft air data sensor providing at least one pressure signal, said drain manifold comprising:
    a separate drain cavity defined in the manifold for each pressure signal;
    the cavity including means for connecting the cavity to the sensor to receive the fluid pressure signal from the air data sensor, and an outlet from the cavity; and
    at least one moisture accumulation chamber extending from the means for connecting in direction so water flows away from the means for connecting when the aircraft on which the drain manifold is mounted is on the ground, the accumulation chamber having means for removing water from such chamber associated therewith.

2. The drain manifold apparatus according to claim 1 wherein said drain cavity comprises a center portion, the pressure signal is carried in a conduit entering and exiting the manifold through the center portion, a baffle wall in the conduit to prevent material from passing through the conduit in the region of the cavity, and opening means in the conduit both upstream and downstream of the baffle wall.

3. The drain manifold of claim 2 wherein there are two accumulation chambers, extending in opposite directions from the center portion.

4. The drain manifold apparatus according to claim 2 wherein the drain manifold has a plurality of cavities, each having a fluid pressure signal connected thereto.

5. The drain manifold apparatus according to claim 4 wherein a plurality of drain valves are mounted on each of said cavities to the drain cavities.

6. The drain manifold apparatus according to claim 4 wherein each cavity is filled with a sponge to absorb accumulated water.

7. The drain manifold apparatus according to claim 2 wherein said manifold has electrical heater means mounted thereon for heating the manifold to evaporate water accumulated in the moisture accumulation chamber.

8. An improved unitized drain apparatus for a conduit of an air data sampling system for air vehicles for substantially separating water from the air in such a system independent of the spatial orientation of the system having:
    first means for receiving air pressure signals from such a system and for substantially separating water particles from the received air pressure;
    second means for transferring air pressure signals having the water substantially separated therefrom to downstream portions of the air data sampling system;
    wherein the improvement comprises means for draining water from the unitized drain apparatus in at least two positions of spatial orientation substantially 180° from each other.

9. The apparatus as specified in claim 8 wherein the means for draining water from the unitized drain apparatus has a plurality of cavities defined therein, for receiving a plurality of independent pressure signals and for maintaining said pressure signals separate from each other.

10. The apparatus as specified in claim 8 wherein said first means for receiving air pressure signals and for substantially separating water from the received air pressure comprises a conduit having an upstream section and a downstream section, and a baffle wall blocking the conduit, separate port means in said conduit at position upstream and downstream of the baffle wall, whereby water will strike the baffle wall and be forced out through the upstream ports in said conduit, said drain apparatus comprising a manifold having a cavity therein, said upstream and downstream ports in said conduit being positioned within the cavity.

11. The apparatus as specified in claim 8 wherein said air data sampling system includes an air data sensing probe, and the unitized drain apparatus comprises a manifold, said manifold being formed integrally with the base of said probe.

12. The apparatus as specified in claim 8 wherein said unitized drain apparatus comprises a manifold mounted directly to an air data sensor.

13. The apparatus as specified in claim 8 wherein said unitized drain apparatus comprises a manifold having a plurality of cavities therein, one for each of the pressure signals sensed by a sensor, said manifold being connectable directly to said sensor and having an opposite side of said manifold adapted to be connected directly to a pressure transducer.

14. The apparatus as specified in claim 8 wherein said means for draining water comprises a water collection chamber having oppositely facing end portions, extending in opposite direction from a center portion, and said oppositely extending end portions each comprising drain chambers having drain passageways therein so that when one such passageway is near the bottom of the drain apparatus, the other drain passageway is near the top and the drain apparatus may be drained when installed on either the right or left hand sides of an air frame.

15. The apparatus of claim 14 and means forming a supplemental chamber coupled to a drain passageway and extending externally of the manifold.

16. The apparatus of claim 15 wherein the means forming a supplemental chamber comprises a length of tubing connected to a cavity and having a removable drain plug at its remote end.

* * * * *